(12) United States Patent
Campbell et al.

(10) Patent No.: US 9,727,446 B2
(45) Date of Patent: Aug. 8, 2017

(54) MODIFIERS THAT CUSTOMIZE PRESENTATION OF TESTED VALUES TO CONSTRAINTS

(71) Applicant: The MathWorks, Inc., Natick, MA (US)

(72) Inventors: Andrew T. Campbell, Medway, MA (US); David M. Saxe, Stow, MA (US)

(73) Assignee: The MathWorks, Inc., Natick, MA (US)

( * ) Notice: Subject to any disclaimer, the term of this patent is extended or adjusted under 35 U.S.C. 154(b) by 441 days.

(21) Appl. No.: 13/705,597

(22) Filed: Dec. 5, 2012

(65) Prior Publication Data
US 2014/0157052 A1    Jun. 5, 2014

(51) Int. Cl.
*G06F 9/44*    (2006.01)
*G06F 11/36*    (2006.01)

(52) U.S. Cl.
CPC ...... *G06F 11/3672* (2013.01); *G06F 11/3664* (2013.01); *G06F 11/3688* (2013.01)

(58) Field of Classification Search
CPC ............. G06F 11/3664; G06F 11/3672; G06F 11/3688; G06F 9/44
See application file for complete search history.

(56) References Cited

U.S. PATENT DOCUMENTS

| | | | | |
|---|---|---|---|---|
| 5,699,507 A * | 12/1997 | Goodnow, II | ...... | G06F 11/3604 714/38.1 |
| 6,507,842 B1 * | 1/2003 | Grey | ........... | G06F 11/3672 |
| 6,865,731 B2 * | 3/2005 | Davia et al. | ........... | 717/127 |
| 6,986,125 B2 * | 1/2006 | Apuzzo et al. | ............ | 717/124 |
| 7,203,928 B2 * | 4/2007 | Mandava et al. | ............ | 717/124 |
| 7,392,507 B2 * | 6/2008 | Kolawa et al. | ............ | 717/124 |
| 7,610,578 B1 * | 10/2009 | Taillefer | ............ | G06F 8/30 717/124 |
| 7,624,372 B1 * | 11/2009 | Stewart | ............ | G06F 8/34 717/106 |
| 7,657,874 B2 * | 2/2010 | Lidin et al. | ............ | 717/126 |
| 7,917,895 B2 * | 3/2011 | Givoni et al. | ............ | 717/124 |
| 8,056,060 B2 * | 11/2011 | Bicheno et al. | ............ | 717/127 |
| 8,180,620 B2 * | 5/2012 | Nightingale | ........ | G06F 11/3672 703/14 |
| 9,201,763 B1 * | 12/2015 | Hruska | ............ | G06F 11/3664 |
| 9,292,419 B1 * | 3/2016 | Kintali | ............ | G06F 11/3676 |
| 9,495,276 B1 * | 11/2016 | Friedman | ............ | G06F 11/3688 |

(Continued)

OTHER PUBLICATIONS

Craig Henderson, "Type independent numeric comparison", Craig Henderson, 2009, <http://craighenderson.co.uk/papers/numeric_compare/>, pp. 1-11.*

(Continued)

*Primary Examiner* — Ziaul A Chowdhury
(74) *Attorney, Agent, or Firm* — Harrity & Harrity, LLP

(57) ABSTRACT

A device receives code generated via a technical computing environment (TCE), the code including a value to be tested, and receives a value modifier, a test case, and a constraint. The value modifier customizes a manner in which the value of the code is presented to the constraint for verification. The device also generates a test based on the value modifier, the test case, and the constraint, performs the test on the value of the code to generate a result, and outputs or stores the result.

20 Claims, 10 Drawing Sheets

(56) References Cited

U.S. PATENT DOCUMENTS

| | | | | |
|---|---|---|---|---|
| 2002/0069193 | A1* | 6/2002 | Beavin et al. | 707/2 |
| 2003/0097650 | A1* | 5/2003 | Bahrs et al. | 717/124 |
| 2003/0152275 | A1* | 8/2003 | Chung | G06T 7/001 382/218 |
| 2003/0220747 | A1* | 11/2003 | Vailaya et al. | 702/19 |
| 2007/0016394 | A1* | 1/2007 | Gaudette | G06F 17/5022 703/19 |
| 2007/0022407 | A1* | 1/2007 | Givoni et al. | 717/124 |
| 2007/0162894 | A1* | 7/2007 | Noller et al. | 717/124 |
| 2007/0250815 | A1* | 10/2007 | Bendapudi et al. | 717/124 |
| 2007/0266165 | A1* | 11/2007 | Li | 709/230 |
| 2007/0300048 | A1* | 12/2007 | Muellers | G06F 9/45512 712/200 |
| 2012/0180025 | A1* | 7/2012 | Webb | G06F 9/4426 717/114 |
| 2013/0159964 | A1* | 6/2013 | Szpak | G06F 11/3684 717/105 |
| 2014/0047275 | A1* | 2/2014 | Eddington | G06F 11/3672 714/37 |
| 2014/0075242 | A1* | 3/2014 | Dolinina | G06F 11/3672 714/27 |

OTHER PUBLICATIONS

"How can I test if an array contains a certain value?", StackOverflow, Jul. 2009, <http://stackoverflow.com/questions/1128723/how-can-i-test-if-an-array-contains-a-certain-value>, pp. 1-11.*

Yin Zhang, "Solving Large_Scale Linear Programs by Interior_Point Methods Under the MATLAB Environment", [Online], 1996, pp. 1-30, [Retrieved from Internet on Apr. 7, 2017], <https://www.researchgate.net/profile/Yin_Zhang12/publication/2769938>.*

Gaurav Sharma et al. "MATLAB: A Language for Parallel Computing", [Online], Springer 2009, pp. 1-34, [Retrieved from Internet on Apr. 7, 2017], <http://s3.amazonaws.com/academia.edu.documents/46622721/s10766-008-0082-5.pdf>.*

Fariha Muzaffar et al., "DSP Implementation of Voice Recognition Using Dynamic Time Warping Algorithm", [Online], IEEE 2005, pp. 1-7, [Retrieved from Internet on Apr. 7, 2017], <http://ieeexplore.ieee.org/stamp/stamp.jsp?arnumber=4382877>.*

Harald J. Zainzinger, "An Artificial Intelligence Based Tool for Home Automation Using MATLAB", [Online], IEEE 1998, pp. 256-261, [Retrieved from Internet on Apr. 7, 2017], <http://ieeexplore.ieee.org/stamp/stamp.jsp?arnumber=744852>.*

* cited by examiner

MODIFIERS THAT CUSTOMIZE PRESENTATION OF TESTED VALUES TO CONSTRAINTS

BRIEF DESCRIPTION OF THE DRAWINGS

The accompanying drawings, which are incorporated in and constitute a part of this specification, illustrate one or more implementations and, together with the description, explain these implementations. In the drawings.

DETAILED DESCRIPTION

The following detailed description refers to the accompanying drawings. The same reference numbers in different drawings may identify the same or similar elements.

A technical computing environment (TCE) may provide a computing environment that allows users to perform tasks related to disciplines, such as, but not limited to, mathematics, science, engineering, medicine, business, etc., more efficiently than if the tasks were performed in another type of computing environment, such as an environment that requires the user to develop code in a conventional programming language, such as C++, C, Fortran, Pascal, etc. In one example, a TCE may include a dynamically-typed programming language (e.g., the M language, a MATLAB® language, a MATLAB-compatible language, a MATLAB-like language, etc.) that can be used to express problems and/or solutions in mathematical notations.

Code generated by the TCE may be tested to determine whether the code will function properly (e.g., when executed). In a simple example, the code may be tested to determine whether a value in the code satisfies a constraint (e.g., is equal to a particular number). If the value satisfies the constraint (i.e., passes), diagnostic information may be generated that informs a programmer that the code functions properly. If the value does not satisfy the constraint (i.e., fails), diagnostic information may be generated that informs the programmer that the code does not function properly.

OVERVIEW

Systems and/or methods described herein may provide modifiers that customize a manner in which a tested value of code is presented to a test constraint for verification. A constraint may include a formal and literate description of what characteristics a tested value should possess. For example, a constraint (e.g., IsEqualTo(5)) may be applied to a tested value (e.g., actual_value), via syntax (e.g., verifyThat(actual_value, IsEqualTo(5))), to determine whether the tested value is equal to five. In this example, the tested value may be presented to the constraint as the tested value appears in the code. The systems and/or methods may provide a modifier that wraps the tested value and presents the tested value to the constraint in a different manner. For example, if the IsEqualTo(5) constraint is used and the actual_value is an array of elements, the constraint may be satisfied when only one of the elements of the array is equal to five. The systems and/or methods may provide a modifier (e.g., AnyElementOf) that enables the determination of whether any element of the actual_value array satisfies the IsEqualTo(5) constraint, according to the following syntax: verify(AnyElementOf(actual_value), IsEqualTo(5)).

Figure 1:
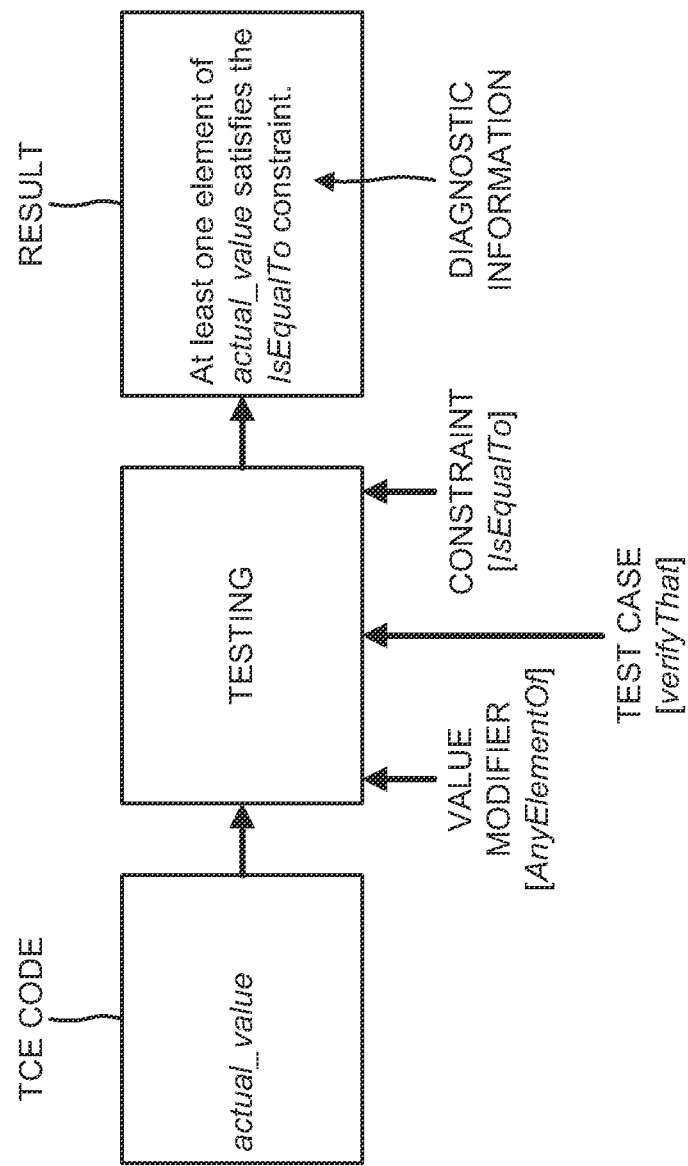
FIG. 1 is a diagram of an overview of an example implementation described herein.

FIG. 1 is a diagram of an overview of an example implementation described herein. As shown in FIG. 1, a computing environment, such as a technical computing environment (TCE), may include a testing component. The testing component may receive code generated by the TCE, and may test the code to determine whether the code will function properly.

As further shown in FIG. 1, the testing component may receive code generated by the TCE. The TCE code may include text-based code that may require further processing to execute, binary code that may be executed, text files that may be executed in conjunction with other executables, etc. In one example, the TCE code may include one or more calculated values (e.g., actual_value) that may be tested by the testing component.

The testing component may receive a value modifier, a test case, and a constraint from a person testing (e.g., a tester) the TCE code. The value modifier may include a mechanism that wraps the tested value (e.g., actual_value) and presents the tested value to the constraint in a different manner. For example, the value modifier (e.g., AnyElementOf) may enable the determination of whether any element of the tested value satisfies the constraint. The test case may include syntax (e.g., verifyThat) to determine whether the tested value satisfies the constraint. The constraint may include a formal and literate description of what characteristics the tested value should possess. For example, the constraint (e.g., IsEqualTo(5)) may be applied to the tested value to determine whether the tested value is equal to five.

The testing component may generate a test for the TCE code based on the value modifier, the test case, and the constraint. In one example implementation, the testing component may combine the value modifier, the test case, and the constraint to create a test application programming interface (API), and may generate the test based on the test API. The testing component may perform the test on the TCE code to generate a result. In one example, the result may include diagnostic information (e.g., "At least one element of actual_value satisfies the IsEqualTo constraint."). The testing component may output (e.g., display to the tester) and/or may store the result.

The terms "code" and "program code," as used herein, are to be used interchangeably and are to be broadly interpreted to include text-based code that may not require further processing to execute (e.g., C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables (e.g., Python text files, a collection of dynamic-link library (DLL) files with text-based combining, configuration information that connects pre-compiled modules, an extensible markup language (XML) file describing module linkage, etc.); etc. In one example, code may include different combinations of the above-identified classes (e.g., text-based code, binary code, text files, etc.). Alternatively, or additionally, code may include code generated using a dynamically-typed programming language (e.g., the M language, a MATLAB® language, a MATLAB-compatible language, a MATLAB-like language, etc.) that can be used to express problems and/or solutions in mathematical notations. Alternatively, or additionally, code may be of any type, such as function, script, object, etc., and a portion of code may include one or more characters, lines, etc. of the code.

Example Environment Arrangement

Figure 2:
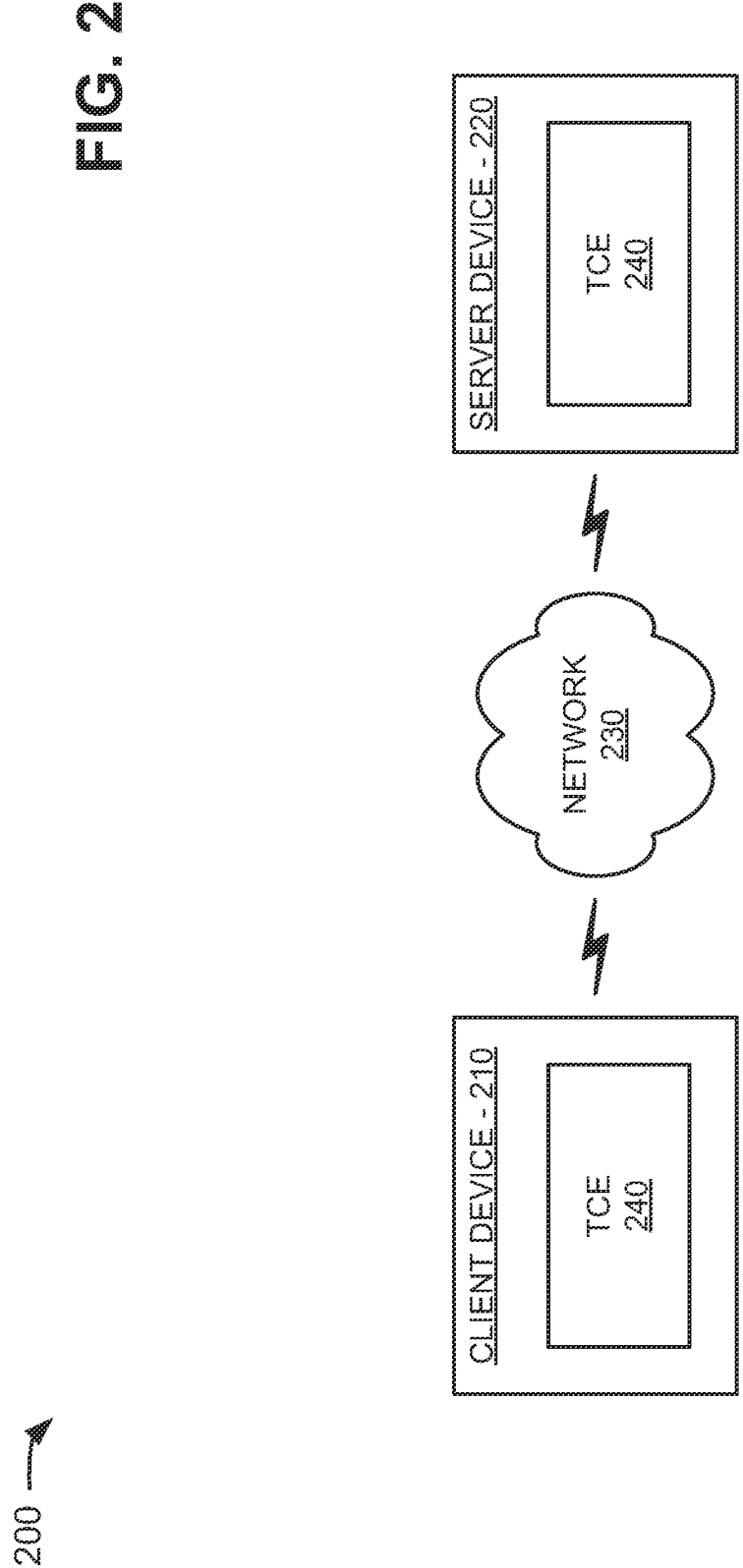
FIG. 2 is a diagram of an example environment in which systems and/or methods described herein may be implemented.

FIG. 2 is a diagram of an example environment 200 in which systems and/or methods described herein may be implemented. As illustrated, environment 200 may include a client device 210 interconnected with a server device 220 via a network 230. Components of environment 200 may interconnect via wired and/or wireless connections. A single client device 210, server device 220, and network 230 have been illustrated in FIG. 2 for simplicity. In practice, environment 200 may include more client devices 210, server devices 220, and/or networks 230. In one example implementation, client device 210 and server device 220 may be provided in a single device or may be provided in separate devices.

Client device 210 may include one or more devices that are capable of communicating with server device 220 via network 230. For example, client device 210 may include a laptop computer, a personal computer, a tablet computer, a desktop computer, a workstation computer, a smart phone, a personal digital assistant (PDA), and/or other computation and communication devices.

Server device 220 may include one or more server devices, or other types of computation and communication devices, that gather, process, and/or provide information in a manner described herein. Server device 220 may include a device that is capable of communicating with client device 210 (e.g., via network 230). In one example, server device 220 may include one or more laptop computers, personal computers, workstation computers, servers, central processing units (CPUs), graphical processing units (GPUs), application-specific integrated circuits (ASICs), field-programmable gate arrays (FPGAs), etc. and/or software (e.g., a simulator) executing on the aforementioned devices. In one example, server device 220 may include TCE 240 and may perform some or all of the functionality described herein for client device 210. Alternatively, server device 220 may be omitted and client device 210 may perform all of the functionality described herein for client device 210.

Network 230 may include a network, such as a local area network (LAN), a wide area network (WAN), a metropolitan area network (MAN), a telephone network, such as the Public Switched Telephone Network (PSTN), an intranet, the Internet, or a combination of networks.

TCE 240 may be provided within a computer-readable medium of client device 210. Alternatively, or additionally, TCE 240 may be provided in another device (e.g., server device 220) that is accessible by client device 210. TCE 240 may include hardware or a combination of hardware and software that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc. In one implementation, TCE 240 may include a dynamically-typed programming language (e.g., the M language, a MATLAB® language, a MATLAB-compatible language, a MATLAB-like language, etc.) that can be used to express problems and/or solutions in mathematical notations.

For example, TCE 240 may use an array as a basic element, where the array may not require dimensioning. These arrays may be used to support array-based programming where an operation may apply to an entire set of values included in the arrays. Array-based programming may allow array-based operations to be treated as high-level programming that may allow, for example, operations to be performed on entire aggregations of data without having to resort to explicit loops of individual non-array operations. In addition, TCE 240 may be adapted to perform matrix and/or vector formulations that can be used for data analysis, data visualization, application development, simulation, modeling, algorithm development, etc. These matrix and/or vector formulations may be used in many areas, such as statistics, image processing, signal processing, control design, life sciences modeling, discrete event analysis and/or design, state based analysis and/or design, etc.

TCE 240 may further provide mathematical functions and/or graphical tools (e.g., for creating plots, surfaces, images, volumetric representations, etc.). In one implementation, TCE 240 may provide these functions and/or tools using toolboxes (e.g., toolboxes for signal processing, image processing, data plotting, parallel processing, etc.). Alternatively, or additionally, TCE 240 may provide these functions as block sets or in another way, such as via a library, etc.

TCE 240 may be implemented as a text-based environment (e.g., MATLAB software; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dynasim; etc.); a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; aspects of a Unified Modeling Language (UML) or SysML environment; etc.); or another type of environment, such as a hybrid environment that includes one or more of the above-referenced text-based environments and one or more of the above-referenced graphically-based environments.

TCE 240 may include a programming language (e.g., the MATLAB language) that may be used to express problems and/or solutions in mathematical notations. The programming language may be dynamically typed and/or array-based. In a dynamically typed array-based computing language, data may be contained in arrays and data types of the data may be determined (e.g., assigned) at program execution time.

For example, suppose a program, written in a dynamically typed array-based computing language, includes the following statements:

A='hello'
A=int32([1, 2])
A=[1.1, 2.2, 3.3].

Now suppose the program is executed, for example, in a TCE, such as TCE 240. During run-time, when the statement "A='hello'" is executed the data type of variable "A" may be a string data type. Later when the statement "A=int32([1, 2])" is executed the data type of variable "A" may be a 1-by-2 array containing elements whose data type are 32 bit integers. Later, when the statement "A=[1.1, 2.2, 3.3]" is executed, since the language is dynamically typed, the data type of variable "A" may be changed from the above 1-by-2 array to a 1-by-3 array containing elements whose data types are floating point. As can be seen by this example, data in a program written in a dynamically typed array-based computing language may be contained in an array. Moreover, the data type of the data may be determined during execution of the program. Thus, in a dynamically type array-based computing language, data may be represented by arrays and data types of data may be determined at run-time.

TCE 240 may provide mathematical routines and a high-level programming language suitable for non-professional programmers and may provide graphical tools that may be used for creating plots, surfaces, images, volumetric representations, or other representations. TCE 240 may provide these routines and/or tools using toolboxes (e.g., toolboxes for signal processing, image processing, data plotting, parallel processing, etc.). TCE 240 may also provide these routines in other ways, such as, for example, via a library, local or remote database (e.g., a database operating in a computing cloud), remote procedure calls (RPCs), and/or an application programming interface (API). TCE 240 may be configured to improve runtime performance when performing computing operations. For example, TCE 240 may include a just-in-time (JIT) compiler.

Although FIG. 2 shows example components of environment 200, in other implementations, environment 200 may include fewer components, different components, differently arranged components, and/or additional components than those depicted in FIG. 2. Alternatively, or additionally, one or more components of environment 200 may perform one or more other tasks described as being performed by one or more other components of environment 200.

Example Device Architecture

Figure 3:
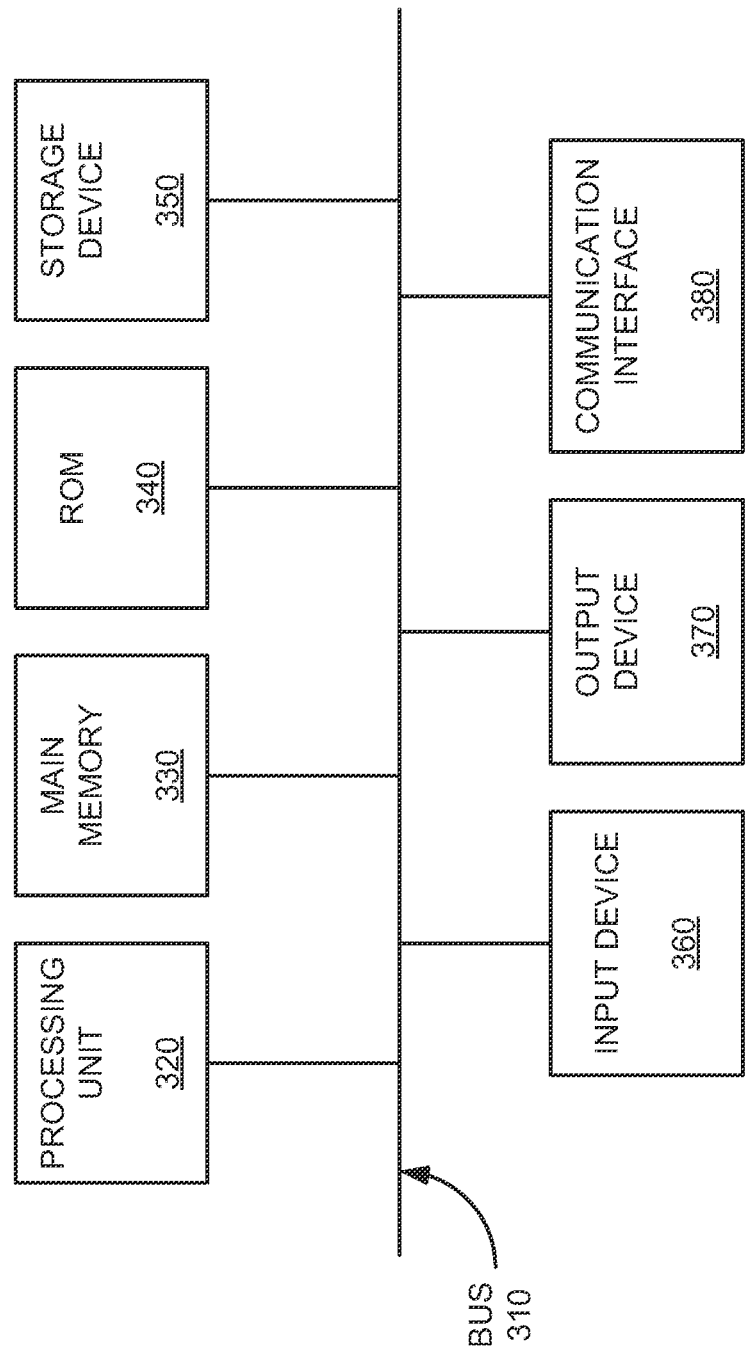
FIG. 3 is a diagram of example components of one or more of the devices of the environment depicted in FIG. 2.

FIG. 3 is an example diagram of a device 300 that may correspond to one or more of the devices of environment 200. As illustrated, device 300 may include a bus 310, a processing unit 320, a main memory 330, a read-only memory (ROM) 340, a storage device 350, an input device 360, an output device 370, and/or a communication interface 380. Bus 310 may include a path that permits communication among the components of device 300.

Processing unit 320 may include one or more processors, microprocessors, or other types of processing units that may interpret and execute instructions. Main memory 330 may include one or more random access memories (RAMs) or other types of dynamic storage devices that may store information and/or instructions for execution by processing unit 320. ROM 340 may include one or more ROM devices or other types of static storage devices that may store static information and/or instructions for use by processing unit 320. Storage device 350 may include a magnetic and/or optical recording medium and its corresponding drive.

Input device 360 may include a mechanism that permits a user to input information to device 300, such as a keyboard, a camera, an accelerometer, a gyroscope, a mouse, a pen, a microphone, voice recognition and/or biometric mechanisms, a remote control, a touch screen, a neural interface, etc. Output device 370 may include a mechanism that outputs information to the user, including a display, a printer, a speaker, etc. Communication interface 380 may include any transceiver-like mechanism that enables device 300 to communicate with other devices, networks, and/or systems. For example, communication interface 380 may include mechanisms for communicating with another device or system via a network.

As described herein, device 300 may perform certain operations in response to processing unit 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, such as storage device 350, or from another device via communication interface 380. The software instructions contained in main memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, and/or additional components than depicted in FIG. 3. Alternatively, or additionally, one or more components of device 300 may perform one or more other tasks described as being performed by one or more other components of device 300.

Example Technical Computing Environment

Figure 4:
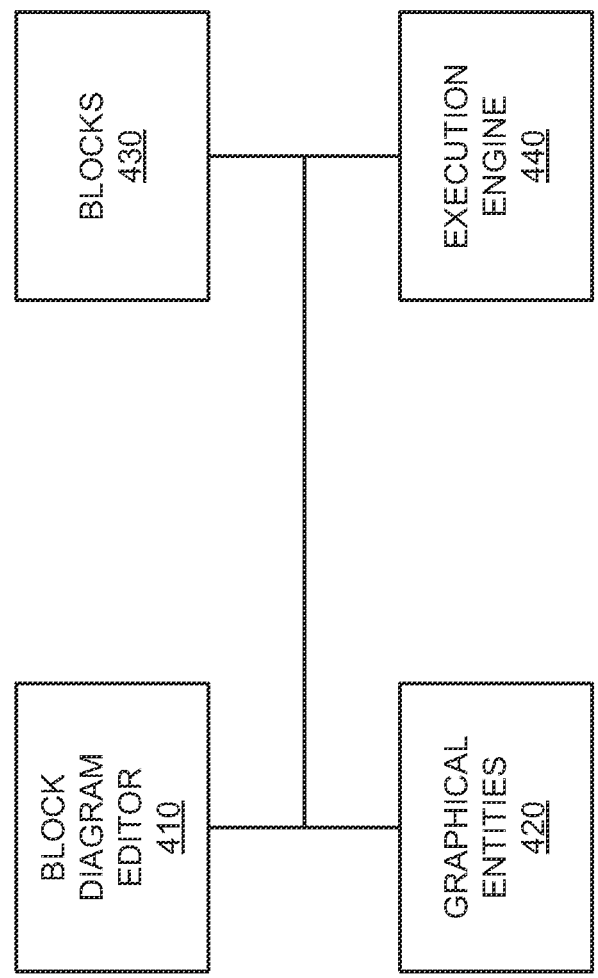
FIG. 4 is a diagram of example functional components of a technical computing environment (TCE) that may be used by one or more of the devices of the environment depicted in FIG. 2.

FIG. 4 is a diagram of example functional components of TCE 240. In one implementation, the functions described in connection with FIG. 4 may be performed by one or more components of device 300 (FIG. 3) and/or by one or more devices 300. As shown in FIG. 4, TCE 240 may include a block diagram editor 410, graphical entities 420, blocks 430, and/or an execution engine 440.

Block diagram editor 410 may include hardware or a combination of hardware and software that may be used to graphically specify models of dynamic systems. In one implementation, block diagram editor 410 may permit a user to perform actions, such as construct, edit, display, annotate, save, and/or print a graphical model (e.g., a block diagram that visually and/or pictorially represents a dynamic system). In another implementation, block diagram editor 410 may permit a user to create and/or store data relating to graphical entities 420.

A textual interface may be provided to permit interaction with block diagram editor 410. A user may write scripts that perform automatic editing operations on a model using the textual interface. For example, the textual interface may provide a set of windows that may act as a canvas for the model, and may permit user interaction with the model. A model may include one or more windows depending on whether the model is partitioned into multiple hierarchical levels.

Graphical entities 420 may include hardware or a combination of hardware and software that may provide entities (e.g., signal lines, buses, etc.) that represent how data may be communicated between functional and/or non-functional units and blocks 430 of a model. Blocks 430 may include fundamental mathematical elements of a block diagram model.

Execution engine 440 may include hardware or a combination of hardware and software that may process a graphical model to produce simulation results, may convert the graphical model into executable code, and/or may perform other analyses and/or related tasks. In one implementation, for a block diagram graphical model, execution engine 440 may translate the block diagram into executable entities (e.g., units of execution) following the layout of the block diagram. The executable entities may be compiled and/or executed on a device (e.g., client device 210) to implement the functionality specified by the model.

Graphical models may include entities with relationships between the entities, and the relationships and/or the entities may have attributes associated with them. The entities may include model elements such as blocks 430 and ports. The relationships may include model elements such as lines (e.g., connector lines) and references. The attributes may include model elements such as value information and meta information for the model element associated with the attributes. Graphical models may be associated with configuration information. The configuration information may include information for the graphical model such as model execution information (e.g., numerical integration schemes, fundamental execution period, etc.), model diagnostic information (e.g., whether an algebraic loop should be considered an error or result in a warning), model optimization information (e.g., whether model elements should share memory during execution), model processing information (e.g., whether common functionality should be shared in code that is generated for a model), etc.

Additionally, or alternatively, a graphical model may have executable semantics and/or may be executable. An executable graphical model may be a time based block diagram. A time based block diagram may consist, for example, of blocks (e.g., blocks 430) connected by lines (e.g., connector lines). The blocks may consist of elemental dynamic systems such as a differential equation system (e.g., to specify continuous-time behavior), a difference equation system (e.g., to specify discrete-time behavior), an algebraic equation system (e.g., to specify constraints), a state transition system (e.g., to specify finite state machine behavior), an event based system (e.g., to specify discrete event behavior), etc. The lines may represent signals (e.g., to specify input/output relations between blocks or to specify execution dependencies between blocks), variables (e.g., to specify information shared between blocks), physical connections (e.g., to specify electrical wires, pipes with volume flow, rigid mechanical connections, etc.), etc. The attributes may consist of meta information such as sample times, dimensions, complexity (whether there is an imaginary component to a value), data type, etc. associated with the model elements.

In a time based block diagram, ports may be associated with blocks (e.g., blocks 430). A relationship between two ports may be created by connecting a line (e.g., a connector line) between the two ports. Lines may also, or alternatively, be connected to other lines, for example by creating branch points. For instance, three or more ports can be connected by connecting a line to each of the ports, and by connecting each of the lines to a common branch point for all of the lines. A common branch point for the lines that represent physical connections may be a dynamic system (e.g., by summing all variables of a certain type to 0 or by equating all variables of a certain type). A port may be an input port, an output port, an enable port, a trigger port, a function-call port, a publish port, a subscribe port, an exception port, an error port, a physics port, an entity flow port, a data flow port, a control flow port, etc.

Relationships between blocks (e.g., blocks 430) may be causal and/or non-causal. For example, a model may include a block that represents a continuous-time integration block that may be causally related to a data logging block by using a line (e.g., a connector line) to connect an output port of the continuous-time integration block to an input port of the data logging block. Further, during execution of the model, the value stored by the continuous-time integrator may change as the current time of the execution progresses. The value of the state of the continuous-time integrator may be available on the output port and the connection with the input port of the data logging block may make this value available to the data logging block.

A sample time may be associated with the elements of a graphical model. For example, a graphical model may include a block (e.g., block 430) with a continuous sample time such as a continuous-time integration block that may integrate an input value as time of execution progresses. This integration may be specified by a differential equation. During execution the continuous-time behavior may be approximated by a numerical integration scheme that is part of a numerical solver. The numerical solver may take discrete steps to advance the execution time, and these discrete steps may be constant during an execution (e.g., fixed step integration) or may be variable during an execution (e.g., variable-step integration).

Alternatively, or additionally, a graphical model may include a block (e.g., block 430) with a discrete sample time such as a unit delay block that may output values of a corresponding input after a specific delay. This delay may be a time interval and this interval may determine a sample time of the block. During execution, the unit delay block may be evaluated each time the execution time has reached a point in time where an output of the unit delay block may change. These points in time may be statically determined based on a scheduling analysis of the graphical model before starting execution.

Alternatively, or additionally, a graphical model may include a block (e.g., block 430) with an asynchronous sample time, such as a function-call generator block that may schedule a connected block to be evaluated at a non-periodic time. During execution, a function-call generator block may evaluate an input and when the input attains a specific value when the execution time has reached a point in time, the function-call generator block may schedule a connected block to be evaluated at this point in time and before advancing execution time.

Further, the values of attributes of a graphical model may be inferred from other elements of the graphical model or attributes of the graphical model. For example, the graphical model may include a block (e.g., block 430), such as a unit delay block, that may have an attribute that specifies a sample time of the block. When a graphical model has an execution attribute that specifies a fundamental execution period, the sample time of the unit delay block may be inferred from this fundamental execution period.

As another example, the graphical model may include two unit delay blocks (e.g., blocks 430) where the output of the first of the two unit delay blocks is connected to the input of the second of the two unit delay block. The sample time of the first unit delay block may be inferred from the sample time of the second unit delay block. This inference may be performed by propagation of model element attributes such that after evaluating the sample time attribute of the second unit delay block, a graph search proceeds by evaluating the sample time attribute of the first unit delay block since it is directly connected to the second unit delay block.

The values of attributes of a graphical model may be set to characteristics settings, such as one or more inherited settings, one or more default settings, etc. For example, the data type of a variable that is associated with a block (e.g., block 430) may be set to a default such as a double. Because of the default setting, an alternate data type (e.g., a single, an integer, a fixed point, etc.) may be inferred based on attributes of elements that the graphical model comprises (e.g., the data type of a variable associated with a connected block) and/or attributes of the graphical model. As another example, the sample time of a block may be set to be inherited. In case of an inherited sample time, a specific sample time may be inferred based on attributes of elements that the graphical model comprises and/or attributes of the graphical model (e.g., a fundamental execution period).

Although FIG. 4 shows example functional components of TCE 240, in other implementations, TCE 240 may include fewer functional components, different functional components, differently arranged functional components, and/or additional functional components than depicted in FIG. 4. Alternatively, or additionally, one or more functional components of TCE 240 may perform one or more other tasks described as being performed by one or more other functional components of TCE 240.

Example Technical Computing Environment Operations

Figure 5:
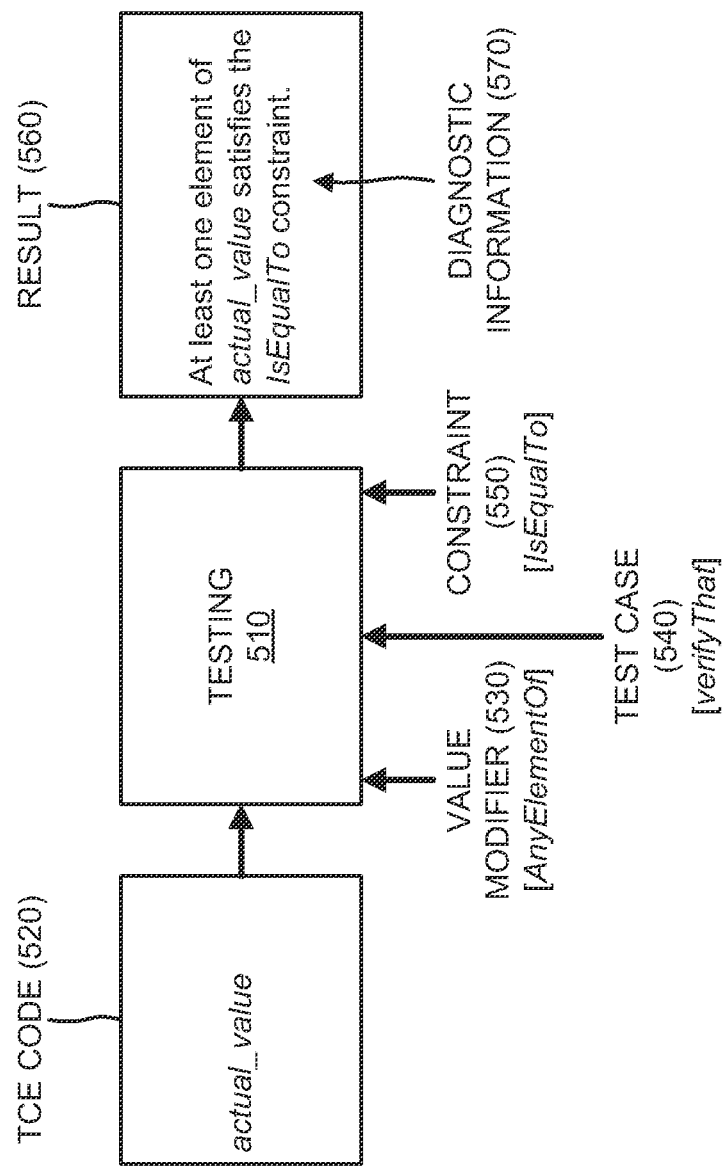
FIG. 5 is a diagram of example operations capable of being performed by the TCE.

FIG. 5 is a diagram of example operations 500 capable of being performed by TCE 240. TCE 240 may include the features described above in connection with, for example, one or more of FIGS. 1-4. As illustrated in FIG. 5, TCE 240 may include a testing component 510. The functions described in connection with testing component 510 may be performed by one or more components of device 300 (FIG. 3) and/or by one or more devices 300.

As further shown in FIG. 5, testing component 510 may receive code 520 generated by TCE 240. TCE code 520 may include text-based code that may require further processing to execute, binary code that may be executed, text files that may be executed in conjunction with other executables, etc. In one example, TCE code 520 may include one or more calculated values (e.g., actual_value) that may be tested by testing component 510.

Testing component 510 may receive a value modifier 530, a test case 540, and a constraint 550 via an input instruction (e.g., produced programmatically or received from a person testing (e.g., a tester) TCE code 520). Value modifier 530 may include a mechanism that wraps the tested value (e.g., actual_value) and presents the tested value to constraint 550 in a different manner. For example, value modifier 530 (e.g., AnyElementOf) may enable the determination of whether any element of the tested value satisfies constraint 550. Alternatively, or additionally, value modifier 530 may include syntax that enables data structures, such as simple arrays, cell arrays, structure arrays, objects, etc. to be presented to constraint 550. Value modifiers 530 may provide an additional degree of freedom for tests and may include intuitive and literate APIs for presentation of tested values to multiple constraints 550.

Test case 540 may include syntax (e.g., verifyThat) to determine whether the tested value satisfies constraint 550. Constraint 550 may include a formal and literate description of what characteristics the tested value should possess. For example, constraint 550 (e.g., IsEqualTo(5)) may be applied to the tested value to determine whether the tested value is equal to five. Alternatively, or additionally, constraint 550 may include other syntax, such as IsGreaterThan, IsLessThan, ContainsSubstring, IsOfClass, etc.

Testing component 510 may generate a test for TCE code 520 based on value modifier 530, test case 540, and constraint 550. In one example implementation, testing component 510 may combine value modifier 530, test case 540, and constraint 550 to create a test API, and may generate the test based on the test API. Testing component 510 may perform the test on TCE code 520 to generate a result 560. In one example, result 560 may include diagnostic information 570 (e.g., "At least one element of actual_value satisfies the IsEqualTo constraint."). Testing component 510 may output (e.g., display to the tester) and/or may store result 560.

In one example implementation, value modifier 530 may enable testing component 510 to create a test API that reads like a sentence so that the test may be self documenting and easy to read. Value modifier 530 may operate on the actual values (e.g., of TCE code 520), and may present the actual values to constraint 550 in a manner that allows a greater degree of flexibility in how the actual values are compared against constraints 550. Value modifier 530 may include a base class that can be sub-classed and supported by constraints 550. For example, value modifier 530 may include syntax (e.g., EveryElementOf) to compare every element of a value (e.g., "a") to a constraint (e.g., IsGreaterThan(4)) to determine whether every element of the value is greater than four. The test API for such a value modifier 530 may include the syntax verifyThat(EveryElementOf(a), IsGreaterThan (4)).

Alternatively, or additionally, value modifier 530 may utilize syntax (e.g., AnyCellOf), for any cell of a value (e.g., "a") and a constraint (e.g., IsEqualTo('Some String')), to assert that any cell of the value is equal to a particular string. The test API for such a value modifier 530 may include the syntax assertThat(AnyCellOf(a), IsEqualTo('Some String')). Alternatively, or additionally, value modifier 530 may utilize syntax (e.g., EveryMethodOf), for every method of a value (e.g., "cls") and a constraint (e.g., IsPublic), to assume that every method of the value is a public method. The test API for such a value modifier 530 may include the syntax assume That(EveryMethodOf(cls), IsPublic). Alternatively, or additionally, value modifier 530 may utilize syntax (e.g., TextInside), for text inside of a file (e.g., "file") and a constraint (e.g., ContainsSubstring('foo')), to verify that text inside the file contains the substring "foo." The test API for such a value modifier 530 may include the syntax verifyThat(TextInside(file), ContainsSubstring('foo')).

Although FIG. 5 shows example operations capable of being performed by TCE 240, in other implementations, TCE 240 may perform fewer operations, different operations, and/or additional operations than depicted in FIG. 5. Alternatively, or additionally, one or more components of FIG. 5 may perform one or more other tasks described as being performed by one or more other components of FIG. 5.

Example Testing Component Operations

Figure 6:
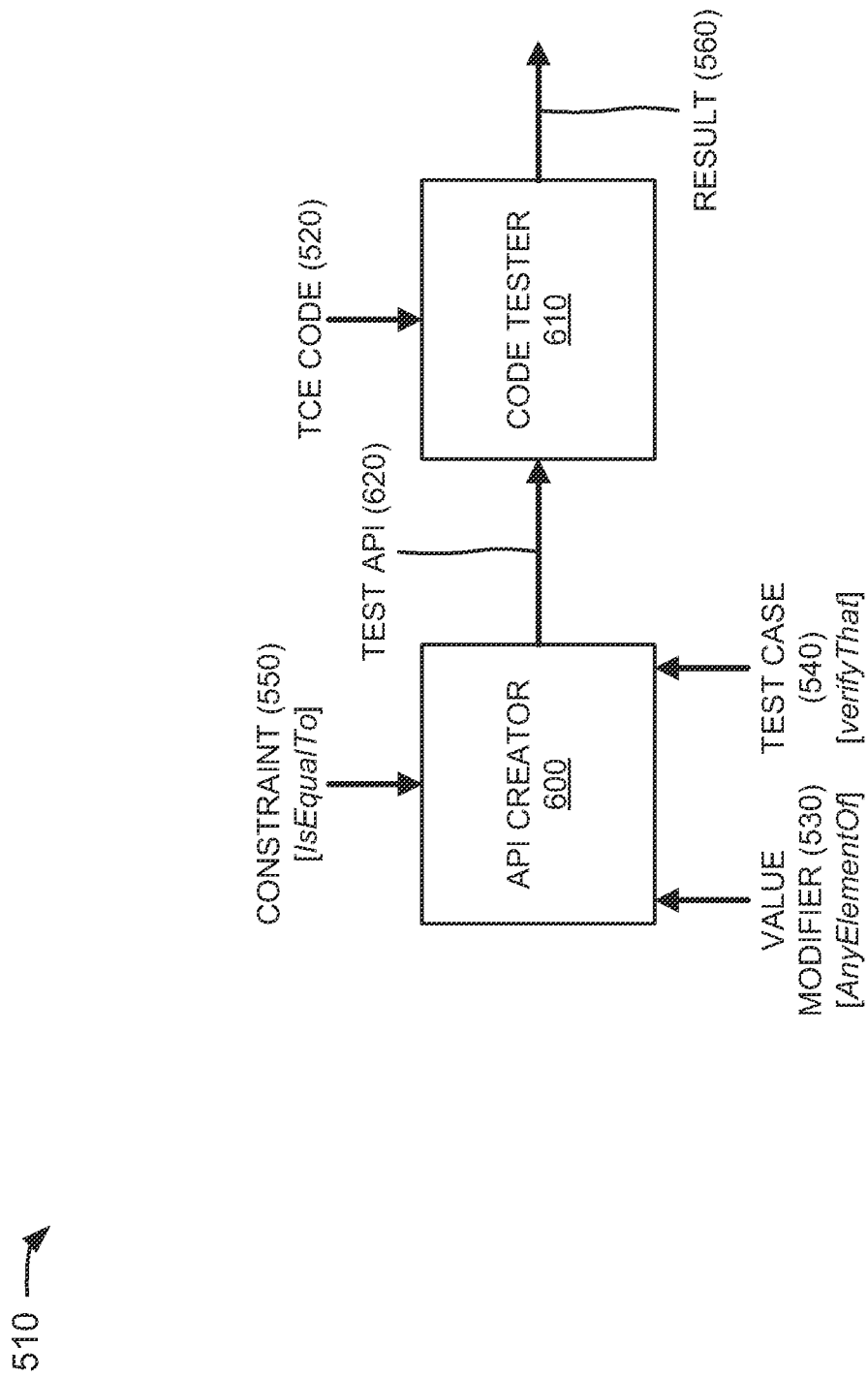
FIG. 6 is a diagram of example functional components of a testing component of the TCE.

FIG. 6 is a diagram of example functional components of testing component 510 (FIG. 5). The functions described in connection with testing component 510 may be performed by one or more components of device 300 (FIG. 3) and/or by one or more devices 300. As shown in FIG. 6, testing component 510 may include an API creator component 600 and a code tester component 610.

API creator component 600 may receive value modifier 530, test case 540, and constraint 550, and may create a test API 620 based on value modifier 530, test case 540, and constraint 550. For example, value modifier 530 may include particular syntax (e.g., AnyElementOf), test case 540 may include particular syntax (e.g., verifyThat), and constraint 550 may include particular syntax (e.g., IsEqualTo). If TCE code 520 includes a value (e.g., actual_value), API creator component 600 may create test API 620 to include the syntax: verifyThat(AnyElementOf(actual_value), IsEqualTo(5)). Such a test API 620 may used to verify that any element of the value (e.g., actual_value) is equal to five. As further shown in FIG. 6, API creator component 600 may provide test APIs 620 to code tester component 610.

Code tester component 610 may receive test API 620 and may generate a test based on test API 620. For example, code tester component 610 may combine test API 620 with one or more other test APIs 620 to create the test. As further shown in FIG. 6, code tester component 610 may receive TCE code 520, and may perform the test on TCE code 520 to generate result 560. Returning to the example above, code tester component 610 may verify that any element of the value (e.g., actual_value) is equal to five, and may output result 560 as either "true" (e.g., if one element of the value equals five) or "false" (e.g., if no elements of the value equal five). Code tester component 610 may output (e.g., display) and/or store result 560.

Although FIG. 6 shows example functional components of testing component 510, in other implementations, testing component 510 may include fewer functional components, different functional components, differently arranged functional components, and/or additional functional components than depicted in FIG. 6. Alternatively, or additionally, one or more functional components of testing component 510 may perform one or more other tasks described as being performed by one or more other functional components of testing component 510.

Figure 7:
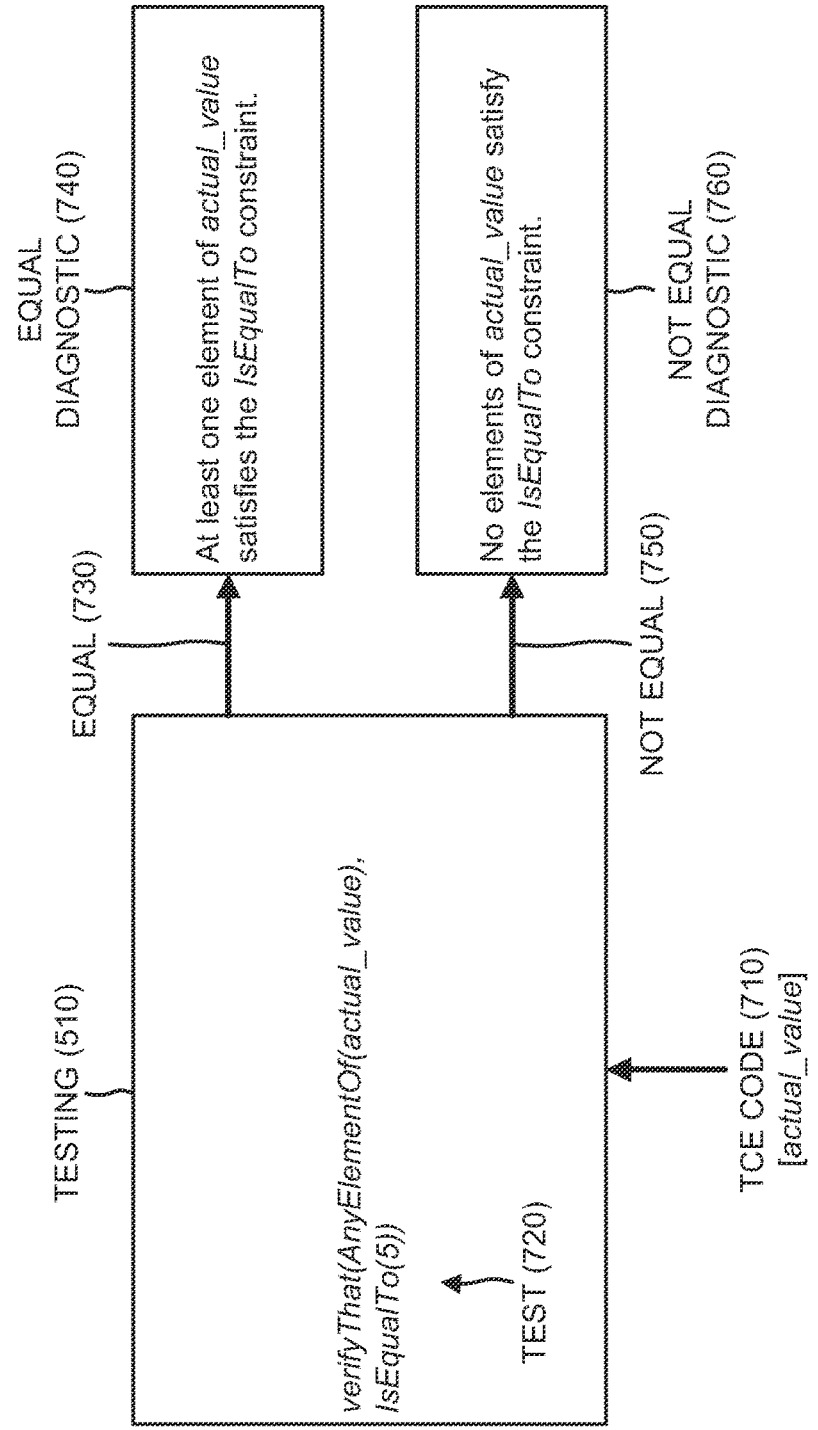
FIG. 7 is a diagram of example operations capable of being performed by the testing component.

FIG. 7 is a diagram of example operations 700 capable of being performed by testing component 510. Testing component 510 may include the features described above in connection with, for example, one or more of FIGS. 1, 5, and 6. As illustrated in FIG. 7, testing component 510 may receive code 710 generated by TCE 240. In one example, TCE code 710 may include a value (e.g., actual_value) that needs to be verified by testing component 510.

Prior to receiving TCE code 710, testing component 510 may receive value modifier 530 (e.g., AnyElementOf), test case 540 (e.g., verifyThat), and/or constraint 550 (e.g., IsEqualTo(5)) from a tester of TCE code 710. Testing component 510 may generate a test 720 for TCE code 710 based on value modifier 530, test case 540, and/or constraint 550. In one example, testing component 510 may combine value modifier 530, test case 540, and constraint 550 to create one or more test APIs, and may generate test 720 based on the test API(s). In one example, test 720 may include the following syntax:

verifyThat(AnyElementOf(actual_value), IsEqualTo(5)).

Testing component 510 may perform test 720 on TCE code 710 to generate a result. For example, as shown in FIG. 7, when any element of the actual_value equals five, the IsEqualTo constraint may be satisfied, as indicated by reference number 730, and an equal diagnostic 740 may be output by testing component 510. In one example, equal diagnostic 740 may include the following information:

At least one element of actual_value satisfies the IsEqualTo constraint.

Alternatively, or additionally, as shown in FIG. 7, when no elements of the actual_value equal five, the IsEqualTo constraint may not be satisfied, as indicated by reference number 750, and a not equal diagnostic 760 may be output by testing component 510. In one example, not equal diagnostic 760 may include the following information:

No elements of actual_value satisfy the IsEqualTo constraint.

Although FIG. 7 shows example operations capable of being performed by testing component 510, in other implementations, testing component 510 may perform fewer operations, different operations, and/or additional operations than depicted in FIG. 7. Alternatively, or additionally, one or more components of FIG. 7 may perform one or more other tasks described as being performed by one or more other components of FIG. 7.

Figure 8:
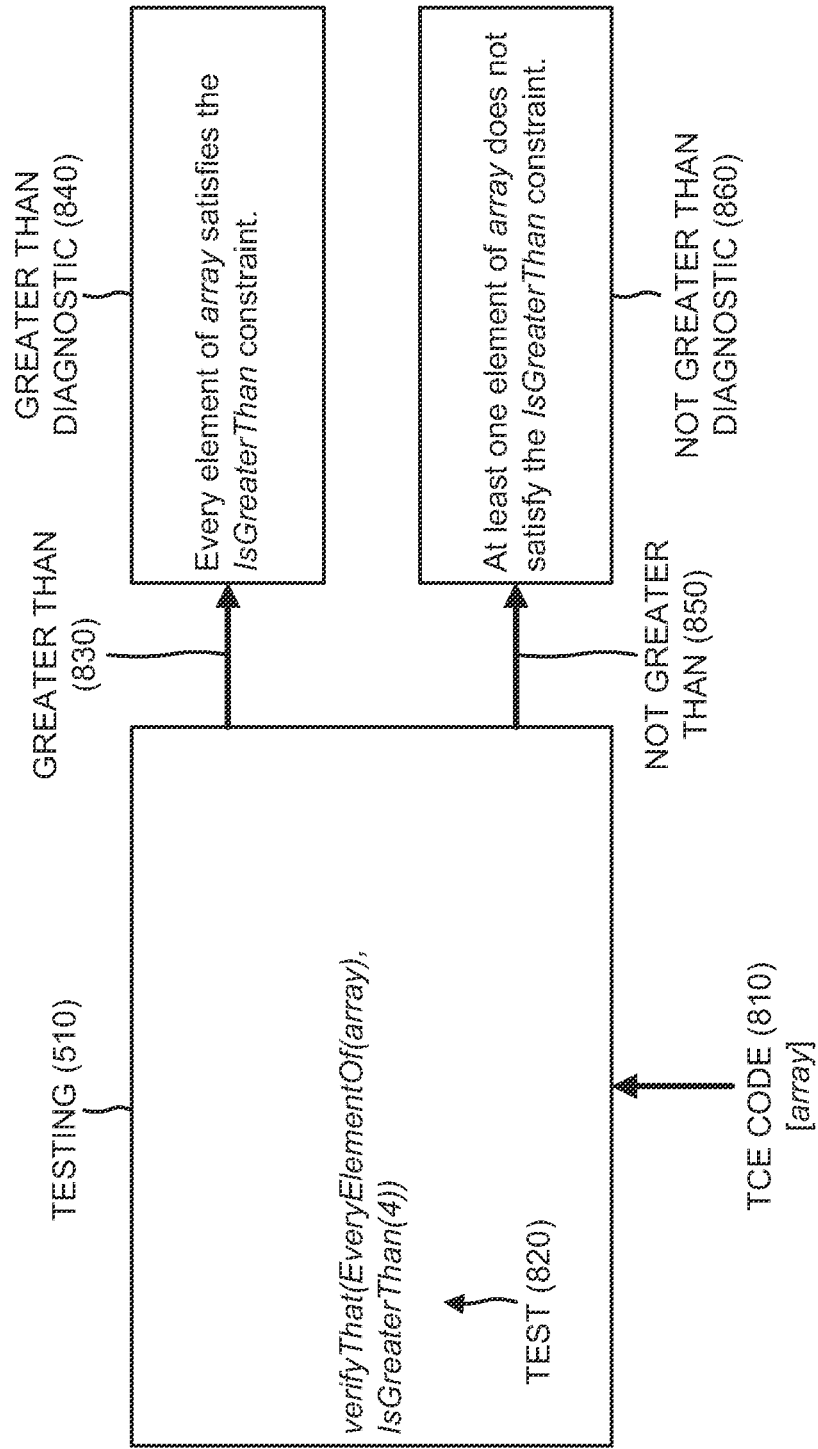
FIG. 8 is a diagram of further example operations capable of being performed by the testing component.

FIG. 8 is a diagram of further example operations 800 capable of being performed by testing component 510. Testing component 510 may include the features described above in connection with, for example, one or more of FIGS. 1 and 5-7. As shown in FIG. 8, testing component 510 may receive code 810 generated by TCE 240. In one example, TCE code 810 may include an array (e.g., array) that needs to be verified by testing component 510.

Prior to receiving TCE code 810, testing component 510 may receive value modifier 530 (e.g., EveryElementOf), test case 540 (e.g., verifyThat), and/or constraint 550 (e.g., IsGreaterThan(4)) from a tester of TCE code 810. Testing component 510 may generate a test 820 for TCE code 810 based on value modifier 530, test case 540, and/or constraint 550. In one example, testing component 510 may combine value modifier 530, test case 540, and/or constraint 550 to create one or more test APIs, and may generate test 820 based on the test API(s). In one example, test 820 may include the following syntax:

verifyThat(EveryElementOf(array), IsGreaterThan(4)).

Testing component 510 may perform test 820 on TCE code 810 to generate a result. For example, as shown in FIG. 8, when every element of the array is greater than four, the IsGreaterThan constraint may be satisfied, as indicated by reference number 830, and a greater than diagnostic 840 may be output by testing component 510. In one example, greater than diagnostic 840 may include the following information:

Every element of array satisfies the IsGreaterThan constraint.

Alternatively, or additionally, as shown in FIG. 8, when at least one element of the array is not greater than four, the IsGreaterThan constraint may not be satisfied, as indicated by reference number 850, and a not greater diagnostic 860 may be output by testing component 510. In one example, not greater than diagnostic 860 may include the following information:

At least one element of array does not satisfy the IsGreaterThan constraint.

Although FIG. 8 shows example operations capable of being performed by testing component 510, in other implementations, testing component 510 may perform fewer operations, different operations, and/or additional operations than depicted in FIG. 8. Alternatively, or additionally, one or more components of FIG. 8 may perform one or more other tasks described as being performed by one or more other components of FIG. 8.

Example Process

Figure 9:
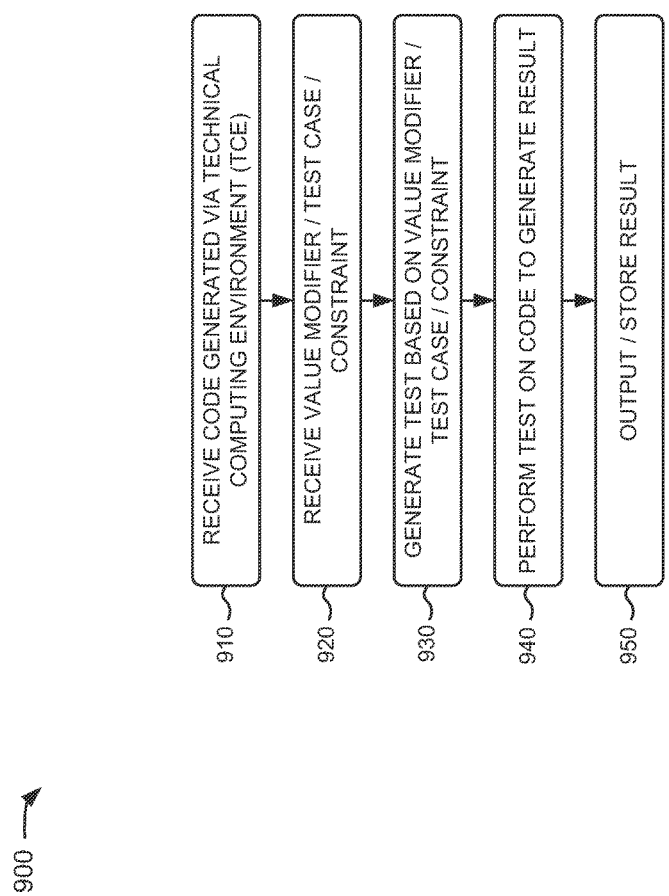
FIGS. 9 and 10 are flow charts of an example process for providing modifiers that customize presentation of tested values to constraints.
Figure 10:
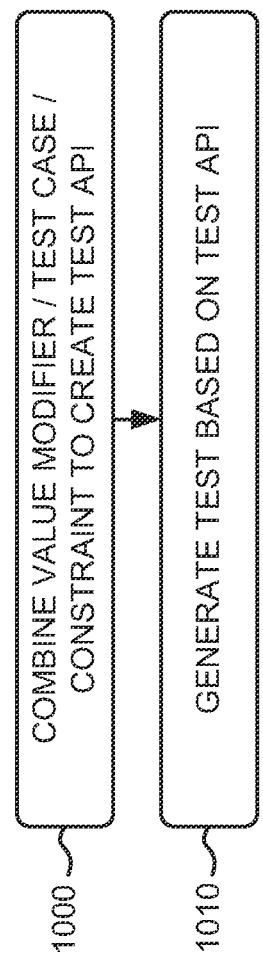

FIGS. 9 and 10 are flow charts of an example process 900 for providing modifiers that customize presentation of tested values to constraints. In one implementation, process 900 may be performed by client device 210/TCE 240. Alternatively, or additionally, process 900 may be performed by another device or a group of devices separate from or including client device 210/TCE 240, such as server device 220.

As shown in FIG. 9, process 900 may include receiving code generated via a technical computing environment (TCE) (block 910), and receiving a value modifier, a test case, and a constraint (block 920). For example, in an implementation described above in connection with FIG. 5, testing component 510 may receive code 520 generated by TCE 240. TCE code 520 may include text-based code that may require further processing to execute, binary code that may be executed, text files that may be executed in conjunction with other executables, etc. Testing component 510 may receive a value modifier 530, a test case 540, and a constraint 550 from a person testing (e.g., a tester) TCE code 520. Value modifier 530 may include a mechanism that wraps the tested value (e.g., actual value) and presents the tested value to constraint 550 in a different manner. Test case 540 may include a test (e.g., verifyThat) to determine whether the tested value satisfies constraint 550. Constraint 550 may include a formal and literate description of what characteristics the tested value should possess.

As further shown in FIG. 9, process 900 may include generating a test based on the value modifier, the test case, and the constraint (block 930), performing the test on the code to generate a result (block 940), and outputting and/or storing the result (block 950). For example, in an implementation described above in connection with FIG. 5, testing component 510 may generate a test for TCE code 520 based on value modifier 530, test case 540, and/or constraint 550. Testing component 510 may perform the test on TCE code 520 to generate result 560. In one example, result 560 may include diagnostic information 570 (e.g., "At least one element of actual_value satisfies the IsEqualTo constraint."). Testing component 510 may output (e.g., display to the tester) and/or may store result 560.

Process block 930 may include the process blocks depicted in FIG. 10. As shown in FIG. 10, process block 930 may include combining the value modifier, the test case, and the constraint to create a test API (block 1000), and generating the test based on the test API (block 1010). For example, in an implementation described above in connection with FIG. 5, testing component 510 may combine value modifier 530, test case 540, and constraint 550 to create a test API, and may generate the test based on the test API.

CONCLUSION

Systems and/or methods described herein may provide modifiers that customize a manner in which a tested value of code is presented to a test constraint for verification. For example, a constraint (e.g., IsEqualTo(5)) may be applied to a tested value (e.g., actual_value), via syntax. The systems and/or methods may provide a modifier that wraps the tested value and presents the tested value to the constraint in a different manner. For example, if the IsEqualTo(5) constraint is used and the actual_value is an array of elements, the constraint may be satisfied when only one of the elements of the array is equal to five. The systems and/or methods may provide a modifier (e.g., AnyElementOf) that enables the determination of whether any element of the actual value array satisfies the IsEqualTo(5) constraint, according to the following syntax: verifyThat(AnyElementOf(actual_value), IsEqualTo(5)).

The foregoing description of implementations provides illustration and description, but is not intended to be exhaustive or to limit the implementations to the precise form disclosed. Modifications and variations are possible in light of the above teachings or may be acquired from practice of the implementations.

For example, while series of blocks have been described with regard to FIGS. 9 and 10, the blocks and/or the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code--it being understood that software and control hardware could be designed to implement the aspects based on the description herein.

Further, certain portions of the implementations may be implemented as a "component" that performs one or more functions. This component may include hardware, such as a processor, an application-specific integrated circuit (ASIC), or a field-programmable gate array (FPGA), or a combination of hardware and software.

Even though particular combinations of features are recited in the claims and/or disclosed in the specification, these combinations are not intended to limit the disclosure of the specification. In fact, many of these features may be combined in ways not specifically recited in the claims and/or disclosed in the specification. Although each dependent claim listed below may directly depend on only one other claim, the disclosure of the specification includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving code generated via a technical computing environment (TCE),
the code including a value to be tested, and
the receiving the code being performed by one or more devices;
receiving a value modifier, a test case, and a constraint,
the one or more devices being unable to determine whether the value satisfies the constraint when the value is compared to the constraint without the value modifier,
the value being associated with a first data type,
the first data type being one of:
a simple array,
a cell array,
a structure array,
an object,
a file, or
a string,
the constraint being associated with a second data type,
the second data type being different from the first data type,
the constraint including a literate description of one or more characteristics that the value should possess,
the value modifier including syntax that specifies a determination of whether any portion of the simple array, the cell array, the structure array, the object, the file, or the string satisfies the constraint, and
the receiving the value modifier, the test case, and the constraint being performed by the one or more devices;
generating a test based on the value modifier, the test case, and the constraint,
the generating being performed by the one or more devices;
performing the test on the value to generate a result,
the performing the test being performed by the one or more devices; and
outputting or storing the result,
the outputting or the storing being performed by the one or more devices.

2. The method of claim 1, where generating the test further comprises:
associating the value modifier, the test case, and the constraint to create a test application programming interface; and
generating the test based on the test application programming interface.

3. The method of claim 1, where the test case includes syntax to determine whether the value satisfies the constraint.

4. The method of claim 1, where the result includes information explaining why the value passed or failed the test.

5. The method of claim 1, where the value modifier indicates that the value satisfies the constraint when every element of the value satisfies the constraint.

6. The method of claim 1, where the value modifier indicates that the value satisfies the constraint when the value includes data, specified by the constraint, of the second data type.

7. The method of claim 1, where the value modifier indicates that the value satisfies the constraint when any portion of the value is equal to data, specified by the constraint, of the second data type.

8. One or more non-transitory computer-readable media storing instructions, the instructions comprising:
one or more instructions that, when executed by a processor of a device, cause the processor to:
receive code generated via a technical computing environment (TCE),
the code including a value to be tested,
receive a value modifier, a test case, and a constraint,
the device being unable to determine whether the value satisfies the constraint when the value is compared to the constraint without the value modifier,
the value being associated with a first data type,
the first data type being one of:
a simple array,
a cell array,
a structure array,
an object,
a file, or
a string,
the constraint being associated with a second data type,
the second data type being different from the first data type,
the constraint including a literate description of one or more characteristics that the value should possess, and
the value modifier including syntax that specifies a determination of whether any portion of the simple array, the cell array, the structure array, the object, the file, or the string satisfies the constraint,
generate a test based on the value modifier, the test case, and the constraint,
perform the test on the value to generate a result, and
output or store the result.

9. The media of claim 8, where the instructions further comprise:
one or more instructions that, when executed by the processor, cause the processor to:
associate the value modifier, the test case, and the constraint to create a test application programming interface, and
generate the test based on the test application programming interface.

10. The media of claim 8, where the test case includes syntax to determine whether the value satisfies the constraint.

11. The media of claim 8, where the value modifier indicates that the value satisfies the constraint when every element of the value satisfies the constraint.

12. The media of claim 8, where the value modifier indicates that the value satisfies the constraint when any portion of the value is equal to data, specified by the constraint, of the second data type.

13. The media of claim 8, where the value modifier indicates that the value satisfies the constraint when any portion of the value is greater than a numerical value specified by the constraint.

14. A device comprising:
a memory; and
one or more processors, communicatively coupled to the memory, to:
receive code generated via a technical computing environment (TCE),
the code including a value to be tested,
receive a value modifier, a test case, and a constraint,
the device being unable to determine whether the value satisfies the constraint when the value is compared to the constraint without the value modifier,
the value being associated with a first data type, the first data type being one of:
a simple array,
a cell array,
a structure array,
an object,
a file, or
a string,
the constraint being associated with a second data type,
the second data type being different from the first data type,
the constraint including a literate description of one or more characteristics that the value should possess, and
the value modifier including syntax that specifies a determination of whether any portion of the simple array, the cell array, the structure array, the object, the file, or the string satisfies the constraint,
generate a test based on the value modifier, the test case, and the constraint,
perform the test on the value to generate a result, and
output or store the result.

15. The device of claim 14, where, when generating the test, the one or more processors are further to:
associate the value modifier, the test case, and the constraint to create a test application programming interface, and
generate the test based on the test application programming interface.

16. The device of claim 14, where the test case includes syntax to determine whether the value satisfies the constraint.

17. The device of claim 14, where the result includes information explaining why the value passed or failed the test.

18. The device of claim 14, where the value modifier indicates that the value satisfies the constraint when any subset of the value satisfies the constraint.

19. The device of claim 14, where the value modifier indicates that the value satisfies the constraint when any cell of the value is equal to a particular string.

20. The device of claim 14, where the value modifier indicates that the value satisfies the constraint when every element of the value satisfies the constraint.

* * * * *